No Printed Specification Available
9482X
M. B. Spafford.
Smut Mill.
Patented Mar. 8, 1836.
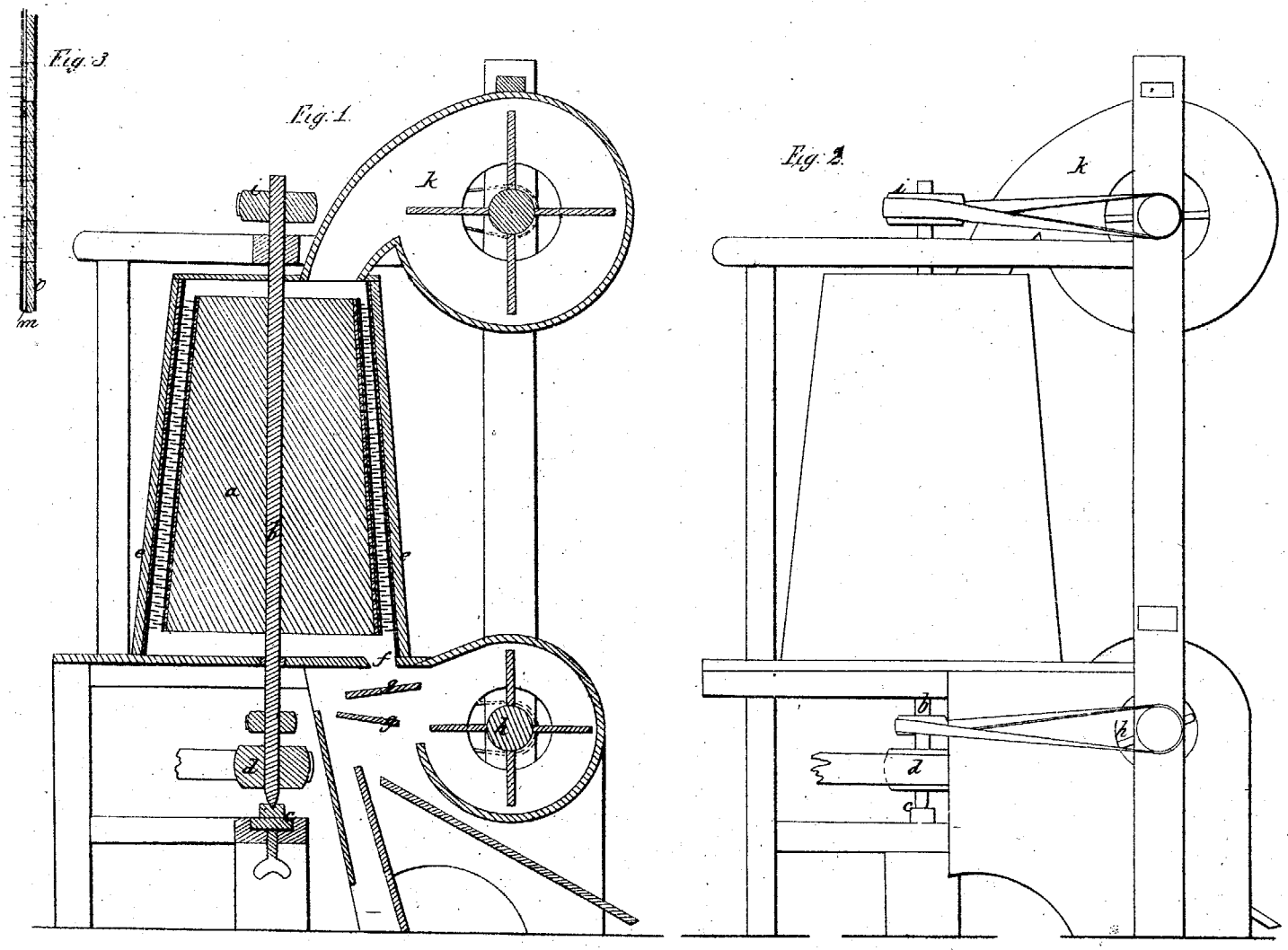

Marcus B. Spafford of Gainesville New York

Letters Patent

The Schedule referred to in these Letters Patent and making part of the same
containing a description in the words of the said Marcus B. Spafford
himself of his improvement in the smut machine.

To all to whom these presents shall come. Be it known that I, Mar-
cus B. Spafford of Gainesville in the County of Genesee and State of
New York, have invented a new and useful improvement in the smut
machine used for cleaning grain, by which I secure the teeth with which
the cone and case are armed, in a manner that renders them at once
firm and stationary, and not liable to yield as happens in the usu-
al method when leather is used, I also introduce a current of air among
these teeth in order to expel the portions of smut and other impuri-
ties as they may be detached, and this being the nature of my im-
provements. I shall proceed to show the manner in which the same
is to be performed, by the following description thereof. In order that
my invention may be better understood, I would state that it is
equally applicable to any revolving body on which teeth are to be
used for the above purpose, but that I prefer an upright conical
shaped cylinder, properly secured into a frame having the top or
smaller end to run with its axis through a cross bar, while the
lower one or base, is to have its axle bearing on a step above which
is placed a pulley to drive the cone by. A conical case surrounds
this at a sufficient distance apart to allow for the introduction
of the teeth and will rest upon a platform placed beneath the
base of the cone, and through which the shaft works there also is an
opening formed in this platform on the line of the circumference of the
cone, intended to allow the wheat or grain to pass through after
leaving the cone, and thence falls upon a slide board beneath the floor
which it passes to fall through a current of air produced by a
fan placed at the end thereof, whence it is conveyed by another slide
board out of the machine, thoroughly cleaned. Two other slides are used opposite to each other to regulate the blast, and the separation of the
light wheat, cheat &c. The step in which the shaft rests, is raised or de
pressed by an application to the cross bar on which it rests, either of
a wedge or screw, so as to let the distance between the cone and case
The Fan is also driven by a strap from a pulley on the shaft of
the cone. and on the top of the cone is to be placed another fan, with
its wind barrel leading into the space amongst the teeth in which the
grain is operated on so as to produce a current of air passing out at
openings left for that purpose at the bottom of the case. In order to secu
the teeth, both on the cone, and case. I drive the teeth (cut nails
will answer well) through a thickness of sole leather having pre
viously laid a thickness of sheet iron beneath. then by applying
the leather to clothe the cone and case, the teeth having pierced bo
the leather and sheet Iron will stand out and form rows oppo
site each other and they will be kept firm and immoveable in
their places by means of the sheet iron being added, which is the
great object I attain. and will be found to produce the most ben
eficial results. What I claim as my improvement and for
which I now ask Letters Patent is not any part of the above
described construction other than the combination of the leather
and sheet iron to retain the teeth used in separating smut from
grain. so as that they shall be immoveable, and also the adaptation
of the fan on the top of the cone to produce a current of air down
wards through the teeth Ex'd. Witnesses
[illegible] Henry Stone
B. K. Morsell Marcus. B. Shafford (715 Words)

(Granted March 8. 1836)